(12) United States Patent
Dharia et al.

(10) Patent No.: US 11,082,643 B2
(45) Date of Patent: Aug. 3, 2021

(54) SYSTEMS AND METHODS FOR BINNING LIGHT DETECTORS

(71) Applicant: Waymo LLC, Mountain View, CA (US)

(72) Inventors: Nirav Dharia, Mountain View, CA (US); Vlad Cardei, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/689,936

(22) Filed: Nov. 20, 2019

(65) Prior Publication Data

US 2021/0152759 A1 May 20, 2021

(51) Int. Cl.
*H04N 5/347* (2011.01)
*H04N 5/343* (2011.01)
*H04N 5/378* (2011.01)

(52) U.S. Cl.
CPC ............ *H04N 5/347* (2013.01); *H04N 5/343* (2013.01); *H04N 5/378* (2013.01)

(58) Field of Classification Search
CPC ................................ H04N 5/378; H04N 5/343
See application file for complete search history.

(56) References Cited

U.S. PATENT DOCUMENTS

| | | | | |
|---|---|---|---|---|
| 6,519,371 B1* | 2/2003 | Pain | ............ | G06T 5/20 348/171 |
| 7,319,218 B2* | 1/2008 | Krymski | ................ | H04N 5/347 250/208.1 |
| 7,379,109 B2* | 5/2008 | Masuyama | ............ | H04N 5/378 348/308 |
| 7,595,828 B2* | 9/2009 | Funatsu | ................ | H04N 5/347 348/302 |
| 7,825,976 B2* | 11/2010 | Masuyama | ............ | H04N 5/378 348/308 |
| 7,999,870 B2* | 8/2011 | Compton | ............. | H04N 5/3741 348/308 |
| 8,130,296 B2* | 3/2012 | Fujimura | ............... | H04N 5/335 348/294 |
| 8,130,302 B2* | 3/2012 | Johnson | ............... | H04N 5/3745 348/308 |
| 8,149,308 B2* | 4/2012 | Masuyama | ....... | H01L 27/14609 348/300 |

(Continued)

*Primary Examiner* — John Villecco
(74) *Attorney, Agent, or Firm* — McDonnell Boehnen Hulbert & Berghoff LLP

(57) ABSTRACT

An example method includes using a plurality of switches corresponding to a plurality of capacitors to select a first set of capacitors for charging at a first time. Charging the first set of capacitors corresponds to sampling from a first set of adjacent light detectors. The method includes using the plurality of switches to select a second set of capacitors from the plurality of capacitors for discharging at a second time. The method includes using a sampling switch to sample an output of the second set of capacitors as they discharge. The output of the second set of capacitors corresponds to the first set of adjacent light detectors. The method includes determining, based on sampling the output of the second set of capacitors, a collective intensity of light received by the first set of adjacent light detectors.

20 Claims, 7 Drawing Sheets

(56) References Cited

U.S. PATENT DOCUMENTS

| | | | | |
|---|---|---|---|---|
| 8,508,636 B2* | 8/2013 | Motonaga | H04N 5/347 | 348/296 |
| 8,717,472 B2* | 5/2014 | Fujimura | H04N 5/335 | 348/294 |
| 8,866,948 B2* | 10/2014 | Yanai | H04N 5/347 | 348/300 |
| 9,001,248 B2* | 4/2015 | Yamanaka | H04N 5/347 | 348/302 |
| 9,124,826 B2* | 9/2015 | Yoo | H04N 5/347 | |
| 9,305,946 B2* | 4/2016 | Ryoki | H04N 5/347 | |
| 9,420,208 B2* | 8/2016 | Tashiro | H04N 9/04557 | |
| 9,473,724 B2* | 10/2016 | Iwane | H04N 5/37457 | |
| 9,686,485 B2* | 6/2017 | Agranov | H04N 5/369 | |
| 9,774,801 B2* | 9/2017 | Hseih | H04N 9/045 | |
| 10,270,987 B2* | 4/2019 | Centen | H04N 5/23216 | |
| 10,551,591 B2* | 2/2020 | Ikeda | H04N 5/36961 | |
| 10,609,348 B2* | 3/2020 | Agranov | H04N 9/045 | |
| 10,785,425 B2* | 9/2020 | Winzenread | H04N 5/378 | |
| 2004/0141079 A1* | 7/2004 | Yamaguchi | H04N 5/374 | 348/308 |
| 2004/0183930 A1* | 9/2004 | Masuyama | H04N 5/378 | 348/294 |
| 2004/0246354 A1* | 12/2004 | Yang | H04N 5/343 | 348/308 |
| 2008/0211949 A1* | 9/2008 | Masuyama | H04N 5/378 | 348/302 |
| 2010/0231773 A1* | 9/2010 | Fujimura | H04N 9/0451 | 348/311 |
| 2011/0267495 A1* | 11/2011 | Atkinson | H04N 5/378 | 348/229.1 |
| 2011/0285886 A1* | 11/2011 | Kato | H04N 9/04511 | 348/297 |
| 2013/0141620 A1* | 6/2013 | Nakajima | H04N 5/347 | 348/302 |
| 2014/0340555 A1* | 11/2014 | Iwane | H04N 5/378 | 348/308 |
| 2015/0350575 A1* | 12/2015 | Agranov | H04N 5/369 | 348/302 |

* cited by examiner

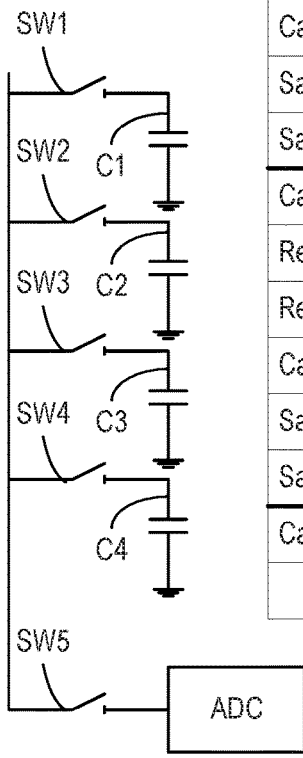

| | | C1 | C2 | C3 | C4 | ADC |
|---|---|---|---|---|---|---|
| BIN 1: A1, A2 | | | | | | |
| Cap Status | 502 | X | X | X | X | X |
| BIN 2: A2, A3 | | | | | | |
| Reset | 504 | RA2 | X | RA2 | RA1 | X |
| Reset Conv. | 506 | Discharge | X | RA2 | Discharge | RA1/RA2 |
| BIN 3: A3, A4 | | | | | | |
| Cap Status | 508 | X | X | RA2 | X | X |
| Sample | 510 | SA1 | SA2 | RA2 | SA2 | X |
| BIN 4: A4, A5 | | | | | | |
| Sample Conv. | 512 | Discharge | Discharge | RA2 | SA2 | SA1/SA2 |
| Cap Status | 514 | X | X | RA2 | SA2 | X |
| Reset Sample | 516 | RA3 | RA3 | RA2 | SA2 | X |
| Reset Conv. | 518 | RA3 | Discharge | Discharge | SA2 | RA3/RA2 |
| Cap Status | 520 | RA3 | X | X | SA2 | X |
| Sample | 522 | RA3 | SA3 | SA3 | SA2 | X |
| Sample Conv. | 524 | RA3 | SA3 | Discharge | Discharge | SA3/SA2 |
| Cap Status | 526 | RA3 | SA3 | X | X | X |
| Reset | 528 | RA3 | SA3 | RA4 | RA4 | X |
| Reset Conv. | 530 | Discharge | SA3 | RA4 | Discharge | RA3/RA4 |
| Cap Status | 532 | X | SA3 | RA4 | X | X |
| Sample | 534 | SA4 | SA3 | RA4 | SA4 | X |
| Sample Conv. | 536 | Discharge | Discharge | RA4 | SA4 | SA4/SA3 |
| Cap Status | 538 | X | X | RA4 | SA4 | X |
| ... | | ... | ... | ... | ... | ... |

```
┌─────────────────────────────────────────────────────────────────┐
│ USING A PLURALITY OF SWITCHES CORRESPONDING TO A PLURALITY OF   │
│ CAPACITORS TO SELECT A FIRST SET OF CAPACITORS FROM THE PLURALITY│ — 602
│ OF CAPACITORS FOR CHARGING AT A FIRST TIME, WHEREIN CHARGING THE│
│ FIRST SET OF CAPACITORS CORRESPONDS TO SAMPLING FROM A FIRST SET│
│ OF ADJACENT LIGHT DETECTORS, WHEREIN THE FIRST SET OF ADJACENT  │
│ LIGHT DETECTORS IS ASSOCIATED WITH AN ARRAY OF LIGHT DETECTORS  │
│ COMPRISING A PLURALITY OF SETS OF ADJACENT LIGHT DETECTORS      │
└─────────────────────────────────────────────────────────────────┘
                                 ↓
┌─────────────────────────────────────────────────────────────────┐
│ USING THE PLURALITY OF SWITCHES TO SELECT A SECOND SET OF       │
│ CAPACITORS FROM THE PLURALITY OF CAPACITORS FOR DISCHARGING AT A│ — 604
│ SECOND TIME, WHEREIN THE SECOND SET OF CAPACITORS IS DIFFERENT  │
│ FROM THE FIRST SET OF CAPACITORS                                │
└─────────────────────────────────────────────────────────────────┘
                                 ↓
┌─────────────────────────────────────────────────────────────────┐
│ USING A SAMPLING SWITCH TO SAMPLE AN OUTPUT OF THE SECOND SET OF│
│ CAPACITORS AS THEY DISCHARGE, WHEREIN THE OUTPUT OF THE SECOND  │ — 606
│ SET OF CAPACITORS CORRESPONDS TO THE FIRST SET OF ADJACENT LIGHT│
│ DETECTORS                                                       │
└─────────────────────────────────────────────────────────────────┘
                                 ↓
┌─────────────────────────────────────────────────────────────────┐
│ DETERMINING, BASED ON SAMPLING THE OUTPUT OF THE SECOND SET OF  │
│ CAPACITORS, A COLLECTIVE INTENSITY OF LIGHT RECEIVED BY THE FIRST│ — 608
│ SET OF ADJACENT LIGHT DETECTORS                                 │
└─────────────────────────────────────────────────────────────────┘
```

FIGURE 6

SYSTEMS AND METHODS FOR BINNING LIGHT DETECTORS

BACKGROUND

Unless otherwise indicated herein, the materials described in this section are not prior art to the claims in this application and are not admitted to be prior art by inclusion in this section.

Image capture devices, such as cameras, include an array of light detectors that sense light in accordance with exposure parameters (e.g., exposure time, gain, etc.). Forming an image using the array of light detectors involves sampling outputs from the light detectors to determine light intensities received at each point in the array.

Many contexts can degrade the quality of an image determined from an array of light detectors. For example, scenes with relatively high light levels or relatively low light levels may result in an image with a relatively low signal to noise (SNR) ratio, which causes an unclear or inaccurate image. Measures taken to alter how an image is captured, or how the image is processed to increase the SNR, such as binning adjacent light sensors, may reduce the resolution of the image.

SUMMARY

In a first example, a system is provided. The system includes an array of light detectors. The array of light detectors comprises a plurality of sets of adjacent light detectors, and each set of adjacent light detectors comprises at least two adjacent light detectors. The system includes a light detector sampling circuit connected to the array of light detectors. The system includes a plurality of capacitors connected in parallel to an output of the light detector sampling circuit via a common node. The system includes a plurality of switches connected to the plurality of capacitors and configured to select the plurality of capacitors for charging and discharging. The system includes a sampling switch connected to the plurality of switches at the common node. The system includes a controller configured to perform a set of functions. The set of functions includes using the plurality of switches to select a first set of capacitors from the plurality of capacitors for charging at a first time. The set of functions includes using the plurality of switches to select a second set of capacitors from the plurality of capacitors for discharging at a second time. The second set of capacitors is different from the first set of capacitors. The set of functions includes using the sampling switch to sample an output of the second set of capacitors as they discharge. The output of the second set of capacitors corresponds to a first set of adjacent light detectors. The set of functions includes determining, based on sampling the output of the second set of capacitors, a collective intensity of light received by the first set of adjacent light detectors.

In a second example, a method is provided. The method includes using a plurality of switches corresponding to a plurality of capacitors to select a first set of capacitors from the plurality of capacitors for charging at a first time. Charging the first set of capacitors corresponds to sampling from a first set of adjacent light detectors. The first set of adjacent light detectors is associated with an array of light detectors including a plurality of sets of adjacent light detectors. The method includes using the plurality of switches to select a second set of capacitors from the plurality of capacitors for discharging at a second time. The second set of capacitors is different from the first set of capacitors. The method includes using a sampling switch to sample an output of the second set of capacitors as they discharge. The output of the second set of capacitors corresponds to the first set of adjacent light detectors. The method includes determining, based on sampling the output of the second set of capacitors, a collective intensity of light received by the first set of adjacent light detectors.

In a third example, a non-transitory computer readable medium is provided. The non-transitory computer readable medium has instructions stored thereon that when executed by a processor cause performance of a set of functions. The set of functions includes using a plurality of switches corresponding to a plurality of capacitors to select a first set of capacitors from the plurality of capacitors for charging at a first time. Charging the first set of capacitors corresponds to sampling from a first set of adjacent light detectors. The first set of adjacent light detectors is associated with an array of light detectors including a plurality of sets of adjacent light detectors. The set of functions includes using the plurality of switches to select a second set of capacitors from the plurality of capacitors for discharging at a second time. The second set of capacitors is different from the first set of capacitors. The set of functions includes using a sampling switch to sample an output of the second set of capacitors as they discharge. The output of the second set of capacitors corresponds to the first set of adjacent light detectors. The set of functions includes determining, based on sampling the output of the second set of capacitors, a collective intensity of light received by the first set of adjacent light detectors.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 5 illustrates a system implementing a method, according to an example embodiment.

FIG. 6 is a block diagram of a method, according to an example embodiment.

DETAILED DESCRIPTION

Figure 1:
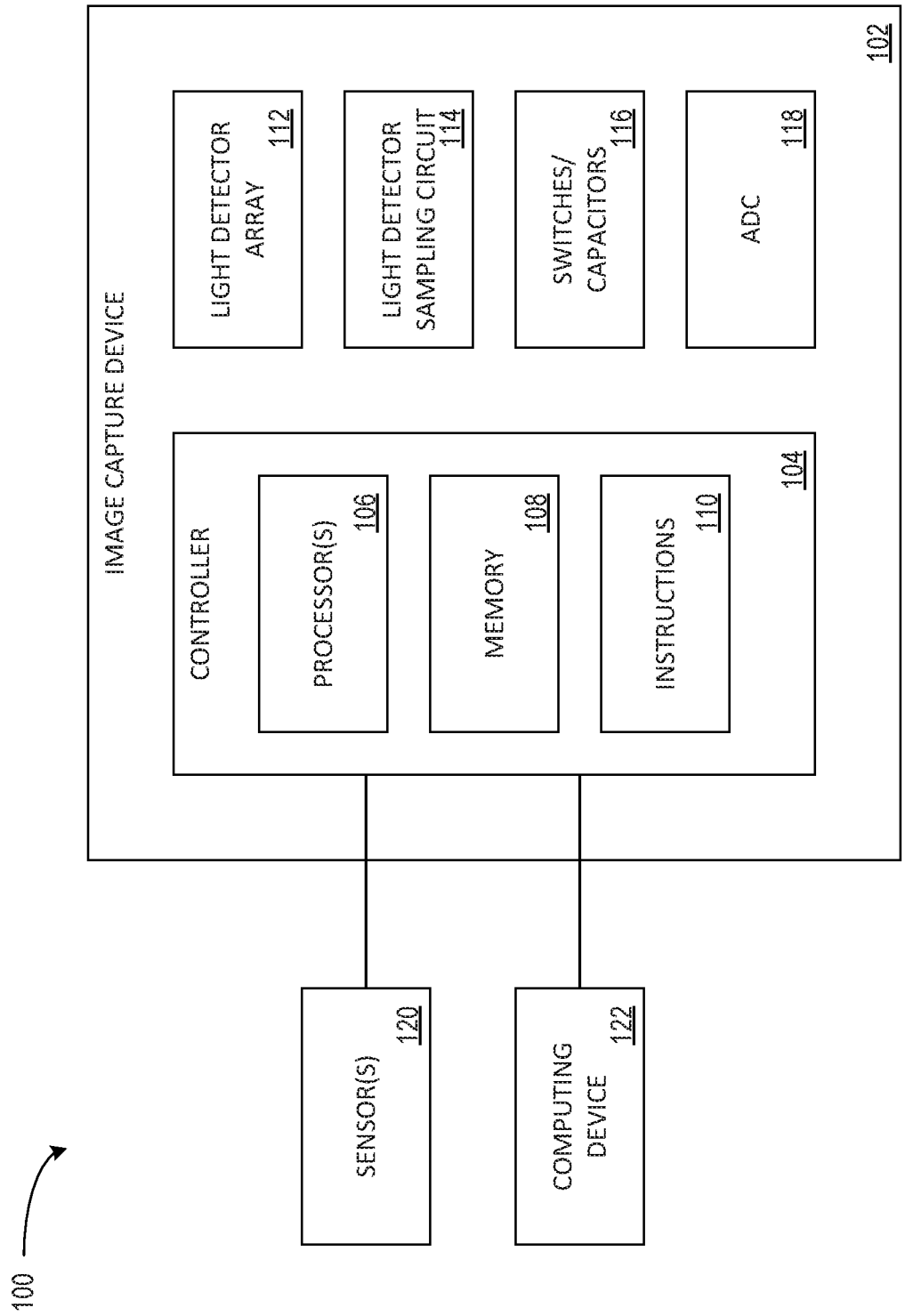
FIG. 1 is a block diagram of a system including an image capture device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

Operating an image capture device involves sampling outputs from an array of light detectors. An amount of incident light received by a given light detector corresponds to an output such that a voltage and or current sampled from the light detector indicates an intensity of light received by the light detector. A system or device used to capture and/or process images using the array of light detectors, such as an image capture device, may determine images differently based on conditions of the environment. For example low-light conditions may result in an image with a relatively low signal to noise ratio (SNR). One way of mitigating this issue is binning adjacent light detectors and using collective intensities of light received by the bins of light detectors to form an image. In this manner, noise can be averaged across several light detectors and the SNR is increased in the image.

However, binning in this manner reduces a resolution of the resulting image. Accordingly, though an increased SNR may allow for increased confidence in later processing of the image (e.g., edge detection or object detection operations), a Modulation Transfer Function (MTF) of the resulting image may decrease due to the decreased resolution. This indicates reduced sharpness, which can decrease confidence in later processing of the image. Thus, benefits of binning light detectors are sometimes mitigated by associated drawbacks. Described herein are alternative ways of binning light detectors to increase SNR while also maintaining a relatively high resolution, allowing for clear images suitable for post-processing operations. In particular, binning light detectors as described below may be used in low-light conditions encountered by a system.

Methods and systems described herein involve using bins that correspond to defined sets of adjacent light detectors, wherein the bins overlap (i.e., share common light detectors). Because the bins overlap, they are sampled in a different manner to a normal image. Namely, values of common light detectors are stored in the form of charge in a set of capacitors, and these values are used over time as a system sequentially samples from each bin. This process includes using a plurality of switches corresponding to a plurality of capacitors to select a first set of capacitors for charging at a first time. Charging the first set of capacitors corresponds to sampling from a first set of adjacent light detectors. The first set of adjacent light detectors is associated with an array of light detectors including a plurality of sets of adjacent light detectors. For example, a first light detector may have a sample value stored twice by two separate capacitors. Next, the plurality of switches are used to select a second set of capacitors from the plurality of capacitors for discharging at a second time that is later than the first time. The second set of capacitors is different from the first set of capacitors at least because only one capacitor storing a charge related to the first light detector is discharged. Other capacitors storing charge related to the first light detector are discharged at later times in relation to a second set of adjacent light detectors, a third set, and so on, depending on how the bins are configured. Outputs from the discharging second set of capacitors are sampled using a sampling switch. In this manner, values corresponding to the first set of adjacent light detectors are sampled, while some values are still stored by the capacitors. Based on sampling the output of the second set of capacitors, a collective intensity of light received by the first set of adjacent light detectors is determined. This may be performed for each bin in the array of light detectors, allowing an image to be formed.

Within further examples, a system is provided that detects an operational state of an image capture device used for capturing the images. Based on determining the operational state (e.g., a low-light state), the image capture device may automatically switch operation modes. Thus binning light detectors as described below may be performed based on a context of the system, such as a location of the system, a light level of an environment of the system, or the like.

II. Example Systems

FIG. 1 is a block diagram of a system including an image capture device, according to an example embodiment. In particular, FIG. 1 shows a system 100 having an image capture device 102. The image capture device 102 includes a controller 104 having processor(s) 106, a memory 108, and instructions 110 stored on the memory 108 and executable by the processor(s) 106 to perform functions.

The processor(s) 106 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 108 may include a computer readable medium, such as a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The image capture device 102 further includes a light detector array 112 (otherwise referred to herein as "an array of light detectors"). The light detector array 112 may include a plurality of adjacent light detectors configured to provide an output in response to receiving light. Different light intensities received by a given light detector result in different outputs (e.g., voltage and/or current outputs). For example, a light detector can be a photoconductor (photoresistor), photovoltaic device (photocell), phototransistor, a photodiode, metal-oxide-semiconductor (MOS) capacitor, or another device capable of producing an output indicative of an intensity of light received by the light detector. Within examples, each light detector of the light detector array 112 may correspond to a pixel in an output image. Thus, within certain contexts herein, a light detector may be referred to in terms of its corresponding pixel in an image. The light detector array 112 may further include circuitry, such as a power source and connectors used for providing power to each given light detector and thereby driving an output associated with a received light intensity at the given light detector.

The image capture device 102 further includes a light detector sampling circuit 114. As described in further detail below, the light detector sampling circuit 114 is configured to detect outputs of specific light detectors in the light detector array 112, perhaps in response to control signals from the controller 104. For example, the controller 104 may cause the light detector sampling circuit 114 to sample outputs from the light detector sequentially.

The image capture device 102 further includes a plurality of switches/capacitors 116. The plurality of switches corresponds to the plurality of capacitors such that a particular capacitor is selectable for charging and discharging by using its corresponding switch. As described in further detail below, the capacitors are used for binning multiple light detectors in the light detectors array 112 so that a collective value can be determined for the light intensities received by each of the binned light detectors. As used herein, the terms "bin" or "binning" are used in reference to grouping a plurality of light sensors together in a set, and may further involve determining a common value for the set of light detectors, such as an average intensity value of the set of light detectors.

The image capture device further includes an Analog-to-Digital converter (ADC) 118. The ADC 118 is used for sampling voltage and/or current values from the light detector sampling circuit 114 of the switches/capacitors 116 depending on an operational mode of the image capture device 102, perhaps based on control signals received from the controller 104. For example, based on a determined light level of an environment (e.g., as sensed by the light detector array 112), the controller 104, may change the mode of operation from a first mode in which values are sampled directly from the light detector sampling circuit 114 to a second mode in which values are sampled from one or more capacitors selected by corresponding switches. Sampling by the ADC 118 in this manner may involve using a sampling switch to connect the ADC 118 to a common node of the light detector sampling circuit 114 and the switches/capacitors 116 at a particular times (e.g., in accordance with cycling through the light detector array 112).

The system 100 further includes sensor(s) 120 and a computing device 122. The sensor(s) 120 may include one or more sensors configured for determining an operational status of the system 100 and/or the image capture device 102. For example, the sensor(s) 120 may include a light detector, Global Positioning System (GPS), Inertial Measurement Unit (IMU), or other sensors capable of providing contextual information about the system 100 to the controller 104. Though depicted as being separate from the image capture device 102, the sensor(s) 120 can be integrated into the image capture device 102, or may be integrated into another device (e.g., a control system of a vehicle) in conjunction with the image capture device 102.

The computing device 122 may be another device having one or more processors, memory, and instructions configured the same or similarly to processor(s) 106, memory 108, and instructions 110 described above. The instructions may be stored in the memory and executable by the one or more processors to carry out functions in accordance with operating the image capture device 102. For example, the computing device 122 may be a controller of the system 100 or a device associated with the system 100. For example, the computing device 122 may provide control signals for a control system of a vehicle.

Though functions described below may be carried out collectively by components of system 100, it should be understood that any such functions may be carried out individually by image capture device 102 and/or controller 104. Further, though aspects of system 100 are depicted as being separate and distinct, in other examples these components may be combined or otherwise altered while still operating as described herein.

Figure 2B:
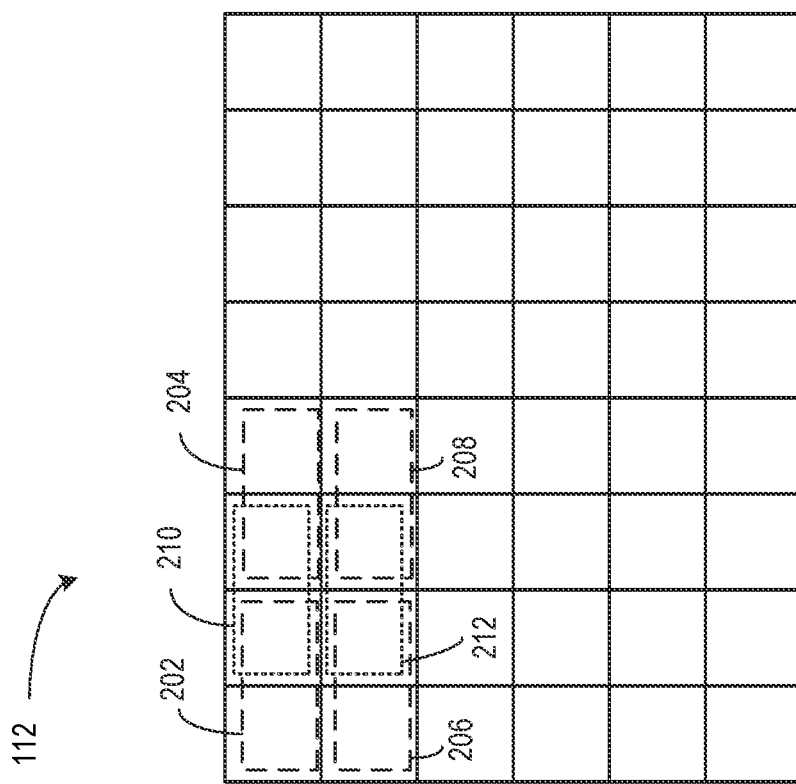
FIG. 2B illustrates an array of light sensors binned in accordance with a second configuration, according to an example embodiment.
Figure 2A:
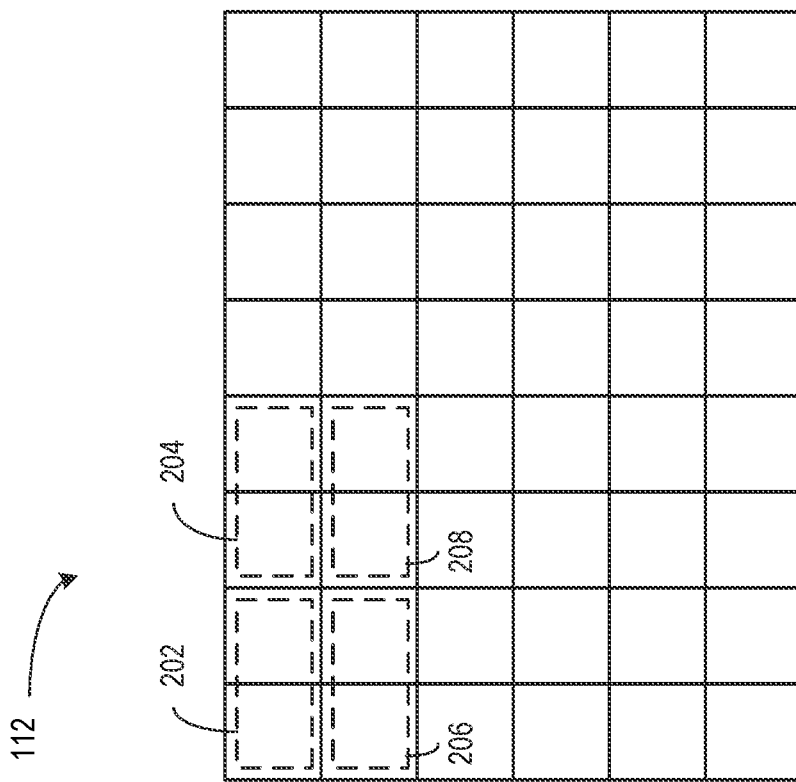
FIG. 2A illustrates an array of light sensors binned in accordance with a first configuration, according to an example embodiment.

FIG. 2A illustrates an array of light sensors binned in accordance with a first configuration, according to an example embodiment. In particular, FIG. 2A shows a 2×1 configuration of binned light detectors in an array 112. For purposes of simplicity, only four bins are shown: bin 202, bin 204, bin 206, and bin 208. As shown, these bins correspond to defined sets of adjacent light detectors that do not overlap. Because the bins do not overlap, they can be sampled in a similar manner to a normal image. That is, each light detector can be sampled sequentially, or each bin can be sampled sequentially. A computing device (e.g., controller 104) can use sampled values from these bins to generate an image that has half the resolution along one dimension, but that has an increased SNR due to binning the light detectors and determining a common light intensity collectively received by the light detectors in each bin (e.g. an average value). Though an increased SNR may allow for increased confidence in later processing of the image (e.g., edge detection or object detection operations) the Modulation Transfer Function (MTF) of the resulting image may decrease due to the decreased resolution. This indicates reduced sharpness, which can decrease confidence in later processing of the image.

FIG. 2B illustrates an array of light sensors binned in accordance with a second configuration, according to an example embodiment. In particular, FIG. 2B shows a different 2×1 configuration of binned light detectors in the array 112. For purposes of simplicity, only six bins are shown: bin 202, bin 204, bin 206, bin 208, bin 210, and bin 212. As shown, these bins correspond to defined sets of adjacent light detectors that do overlap. For example, bin 202 includes a first light detector and a second light detector, bin 210 includes the second light detector and a third light detector, bin 204 includes the third light detector and a fourth light detector, and so on. Because the bins overlap, they are sampled in a different manner to a normal image, as explained further below with respect to FIGS. 4A, 4B, and 5.

Having overlapping 2×1 bins such as those shown in FIG. 2B also allows for an increased SNR similar to that described above with respect to FIG. 2A. However, because the bins overlap, the resolution of any resulting image from the 2×1 configuration of FIG. 2B is increased relative to the 2×1 configuration depicted in FIG. 2A. More particularly, where there are M rows and N columns, the relative resolution shown in FIG. 2A is M×N/2 and the relative resolution shown in FIG. 2B is M×N−1. This allows the configuration of binned light detectors in FIG. 2B to produce an improved MTF relative to that shown in FIG. 2A.

Figure 3B:
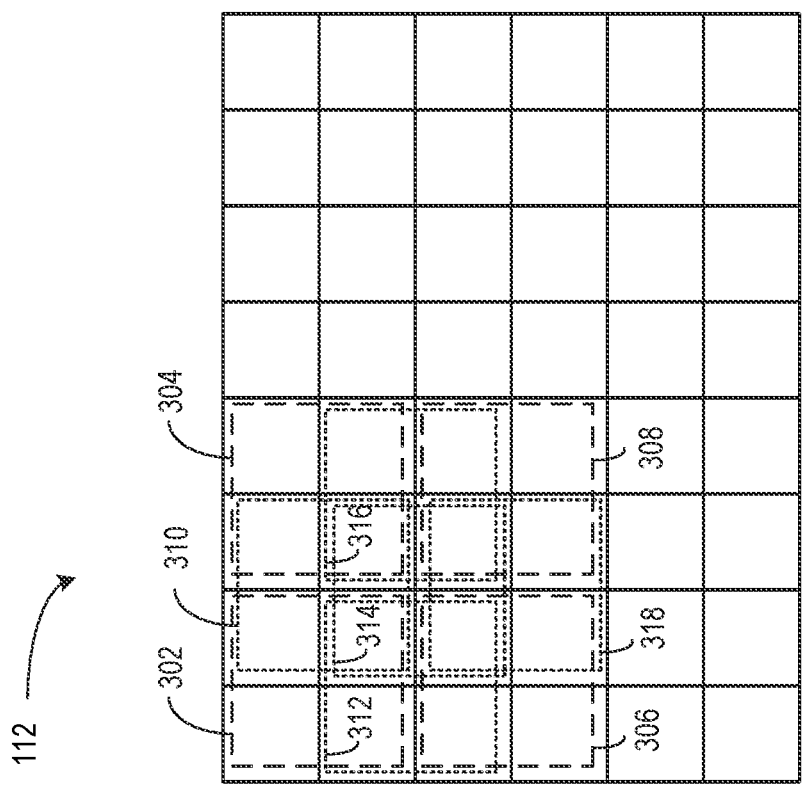
FIG. 3B illustrates an array of light sensors binned in accordance with a fourth configuration, according to an example embodiment.
Figure 3A:
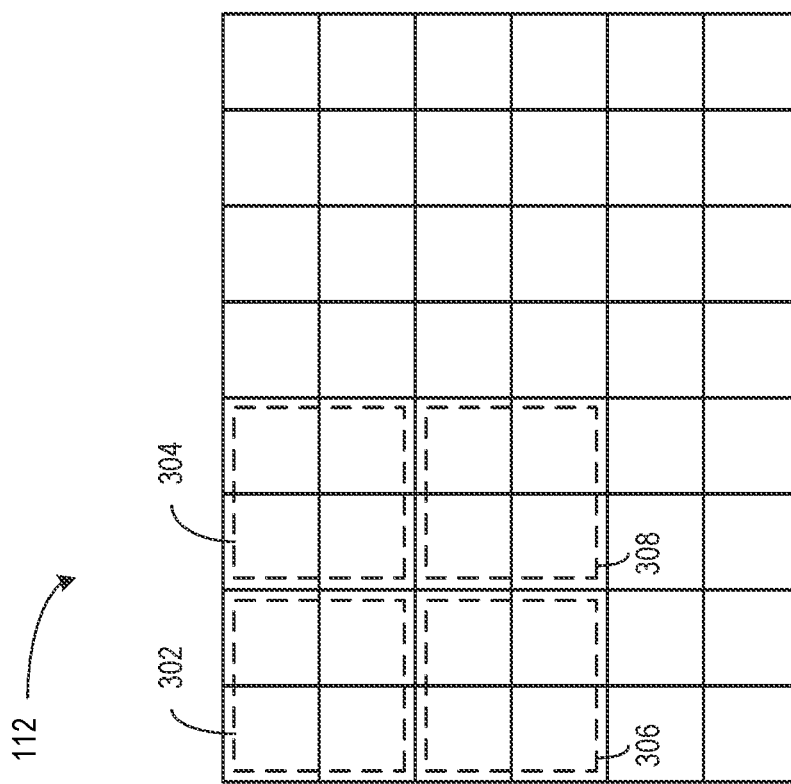
FIG. 3A illustrates an array of light sensors binned in accordance with a third configuration, according to an example embodiment.

FIG. 3A illustrates an array of light sensors binned in accordance with a third configuration, according to an example embodiment. In particular, FIG. 3A shows a 2×2 configuration of binned light detectors in an array 112. For purposes of simplicity, only four bins are shown: bin 302, bin 304, bin 306, and bin 308. As shown, these bins correspond to defined sets of adjacent light detectors that do not overlap. Because the bins do not overlap, they can be sampled in a similar manner to a normal image. That is, each light detector can be sampled sequentially, or each bin can be sampled sequentially. A computing device (e.g., controller 104) can use sampled values from these bins to generate an image that has half the resolution along both dimensions of the image, but that has an increased SNR due to binning the light detectors and determining a common light intensity collectively received by the light detectors in each bin (e.g. an average value). Though an increased SNR may allow for increased confidence in later processing of the image (e.g., edge detection or object detection operations) the MTF of the resulting image may decrease due to the decreased resolution. This indicates reduced sharpness, which can decrease confidence in later processing of the image.

FIG. 3B illustrates an array of light sensors binned in accordance with a fourth configuration, according to an example embodiment. In particular, FIG. 3B shows a different 2×2 configuration of binned light detectors in the array 112. For purposes of simplicity, only nine bins are shown: bin 302, bin 304, bin 306, bin 308, bin 310, bin 312, bin 314, bin 316, and bin 318. As shown, these bins correspond to defined sets of adjacent light detectors that do overlap. For example, along a first dimension of array 112, bin 302 shares two light detectors with bin 310, bin 310 shares two light detectors with bin 304, and so on. Further, along a second dimension of array 112, bin 302 shares two light detectors with bin 312, bin 312 shares two light detectors, and so on. Because the bins overlap, they are sampled in a different manner to a normal image, as explained further below with respect to FIGS. 4A, 4B, and 5.

Having overlapping 2×2 bins such as those shown in FIG. 3B also allows for an increased SNR similar to that described above with respect to FIG. 3A. However, because the bins overlap, the resolution of any resulting image from the 2×2 configuration of FIG. 3B is increased relative to the 2×2 configuration depicted in FIG. 3A. More particularly, where there are M rows and N columns, the relative resolution shown in FIG. 3A is M/2×N/2 and the relative resolution shown in FIG. 3B is M−1×N−1. This allows the configuration of binned light detectors in FIG. 3B to produce an improved MTF relative to that shown in FIG. 3A. Further, because the SNR resulting from the configuration of binned light detectors in FIG. 3B can be better than that provided by the configuration of FIG. 2B (due to using more common light detectors in each bin) this configuration may provide an improved MTF relative to that shown in FIG. 2B.

Though only 2×1 and 2×2 configurations of binned light detectors are shown in FIGS. 2A, 2B, 3A, and 3C, it should be understood that other configurations of binned light detectors, such as 1×2, 2×3, 3×2, 3×3, combinations thereof, etc. could be used. Further, while various configurations may provide a relatively high SNR and relatively high MTF values compared to one another, practical considerations such as processing time and sampling frequency may impact which configuration best suits a given system.

Figure 4A:
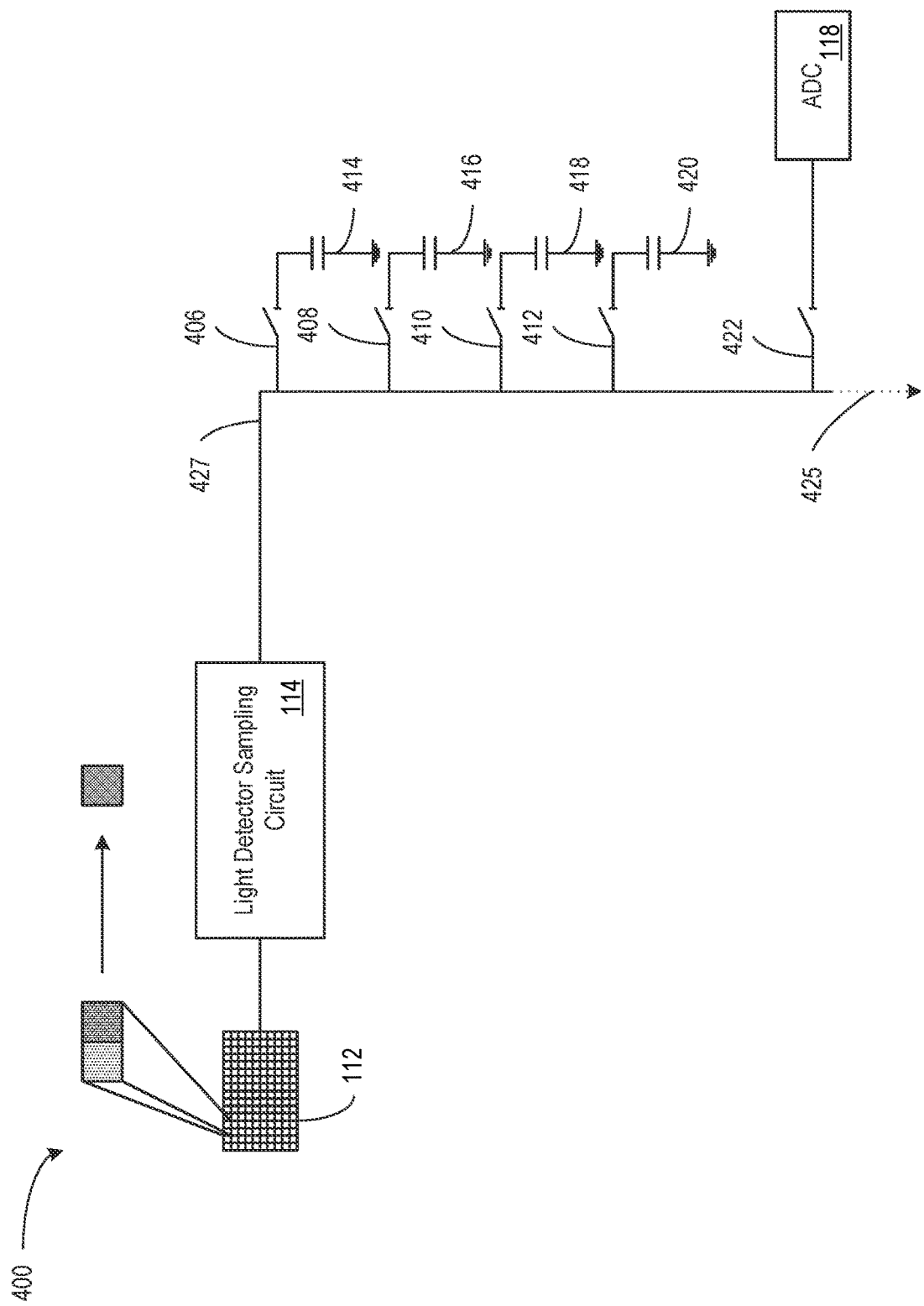
FIG. 4A illustrates a system, according to an example embodiment.

FIG. 4A illustrates a system, according to an example embodiment. In particular, FIG. 4A shows a system 400 that includes an array of light detectors 112, a light detectors sampling circuit 114, a plurality of switches 406, 408, 410, and 412 corresponding to a plurality of capacitors 414, 416, 418, and 420, a sampling switch 422, and an Analog-to-Digital converter (ADC) 118. Collectively these components of system 400 may be used to capture images in accordance with one or more operational modes of the system 400.

The array of light detectors 112 includes a plurality of sets of adjacent light detectors. As shown in FIG. 4A, each set includes two adjacent light detectors. However, in other examples more light detectors can be included in each set of light detectors. The light detector sampling circuit 114 is connected to the array of light detectors 112, and is configured to sample a reset value for each light detector (e.g., a baseline output of the light detector and/or associated circuitry, such as an associated transistor) and to sample an output of each light detector to provide the output to the ADC 118 via a common node 427 shared by the light detector sampling circuit, the plurality of switches, and the sampling switch 422. The sampling switch 422 can be used to allow the ADC 118 to sample an output from one or more light detectors via the common node 427 or from one or more of the capacitors via the common node 427. As described further below, depending on an operational mode of the system 400, the sampling switch 422 may sample directly from the light detector sampling circuit or from one or more of the plurality of capacitors using the sampling switch 422 in conjunction with the plurality of switches corresponding to the plurality of capacitors.

Within examples, the system 400 operates differently based on an operation mode of the system. In a normal operation mode, (e.g., in a default mode of an image capture device associated with the system 400, or under an expected operational condition, such as an expected light level), the array of light detectors is sampled directly from the light detector sampling circuit 114 using the sampling switch 422. In a low-light operation mode (e.g., under a threshold light level, such as 50 Lux), the array of light detectors 112 may be binned as depicted in FIG. 4A, and the plurality of switches may operate to select sets of capacitors for storing reset values and sampled values of the light detectors to determine collective intensities of light received by the each set of adjacent light detectors. Further details of this operation mode are described below with respect to FIG. 5.

FIG. 4A shows a 2×1 bin of light detectors and a corresponding set of capacitors that includes four capacitors: capacitors 414, 416, 418, and 420. In other examples, bins might include more light detectors and more capacitors correspondingly are used to store reset and sample values for those light detectors. In still other examples, multiple rows of light detectors might be sampled in parallel. Accordingly, parallel sets of capacitors and/or sampling circuits can be used in certain examples. This is depicted in FIG. 4A with a parallel system indicator 425. Each of these parallel systems may be configured similarly to the system 400, and may share components or functionality. For example, the controller 104 may operate each parallel set of capacitors and/or sampling circuits in conjunction, and the parallel sets of capacitors may share the ADC 118. In other examples, parallel systems may operate independently of one another to sample from multiple portions of the array of light detectors 112 (e.g., different rows and/or bins).

Figure 4B:
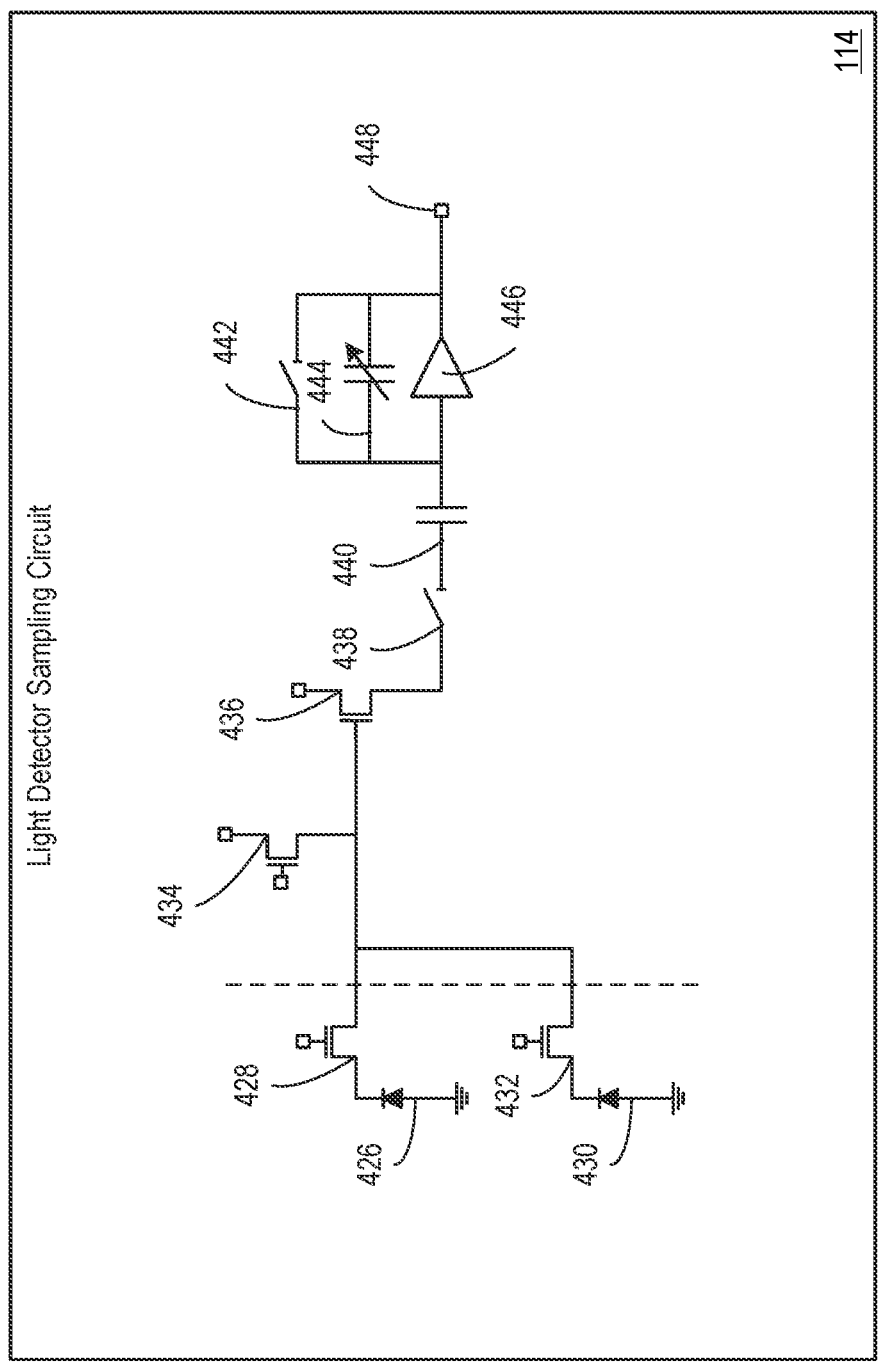
FIG. 4B illustrates a light detector sampling circuit, according to an example embodiment.

FIG. 4B illustrates a light detector sampling circuit, according to an example embodiment. In particular, FIG. 4B shows an example of the light detector sampling circuit 114 shown in FIG. 4A. The light detector sampling circuit 114 relates to sampling from light detectors 426 and 430, which are shown as diodes in FIG. 4B, and corresponding transistors 428 and 432. The light detectors 426 and 430 and corresponding transistors 428 and 432 may be part of the array of light detectors 112 and are shown in FIG. 4B for illustrative purposes. The corresponding transistors 428 and 432 are connected to a current output terminal of a reset transistor 434 and a control input terminal of a sampling transistor 436. Operationally biasing the reset transistor drives a reset value of the light detectors 426 and 430. Operationally biasing the corresponding transistors 428 and 432 drives sample values of the light detectors 426 and 430 respectively. In this context, a sample value corresponds to an intensity of light received by a light detector. The light detector sampling circuit 114 further includes a sampling transistor 436, a switch 438, a capacitor 440, a switch 442, a variable capacitor 444, and an amplifier 446. These components of the light detector sampling circuit 114 collectively form a source follower configured to selectively drive an output (i.e., either a reset value or a sample value) to an output node 448. The output node 448 corresponds to the common node 427 of the system 400 depicted in FIG. 4A.

FIG. 5 illustrates a system implementing a method, according to an example embodiment. For example, the system may be the same or similar to system 400 described above. FIG. 5 depicts a plurality of bins of light detectors, which are subsets of an array of light detectors. Four such bins are described. Bin 1 includes light detectors A1 and A2, Bin 2 includes light detectors A2 and A3, Bin 3 includes light detectors A3 and A4, and Bin 4 includes light detectors A4 and A5. These bins correspond to 2×1 bins that overlap sequentially, similar to the bins shown in FIG. 2B. A plurality of capacitors, C1, C2, C3, and C4 are selected by a corresponding plurality of switches to either charge or discharge sets of capacitors at different times in accordance with sampling from the plurality of bins. Because the bins share common light detectors, values corresponding to those light detectors are stored by sets selected from the plurality of capacitors and used over time. A sampling switch is used to allow an ADC to sample values from discharging capacitors via a common node.

The method implemented by the system may be performed based on control instructions (e.g., from the controller 104) that cause the plurality of switches to select sets of capacitors for charging and discharging. These functions may be carried out at a plurality of times, as shown by the state diagram depicted in FIG. 5. Within the present example, the method performed by the system 500 is carried out in a plurality of sequential steps corresponding to each bin. In particular, for each bin, the system 500 has a reset state, a reset conversion state, a sample state, and a sample conversion state. By sampling outputs in accordance with these states, the system 500 can determine a collective intensity of light received by each bin. This may be performed over a sequence of bins to determine an image. Three iterations of this process are described below.

In relation to Bin 1, at or before time 502, each capacitor has zero or minimal charge and the ADC does not sample any output from the common node. At or before time 504, a reset value (denoted by the prefix "R") for light detector A1 is stored by closing switch SW4 and thereby charging capacitor C4 and a reset value for light detector A2 is stored by closing switches SW1 and SW3 and thereby charging capacitors C1 and C3. Thus, the reset value for light detector A2 is stored twice: first in relation to Bin 1, and second in relation to Bin 2, as described further below. In this manner, a reset value can be used to establish the readout noise associated with light detectors A1 and A2. At or before time 506, reset conversion is performed, which involves opening switches SW1 and SW4 and closing switch SW5 and thereby discharging capacitors C1 and C4 to provide outputs corresponding to reset values of light detectors A2 and A1 respectively. The outputs are converted, by the ADC while selected by switch SW5, to a digital value used for determining the readout noise associated with light detectors A1 and A2. At or before time 508, capacitors C1, C2, and C4 have zero or minimal charge and the ADC does not sample any output from the common node. However, capacitor C3 was not selected for discharging and thus still stores a charge corresponding to a reset value for light detector A2.

At or before time 510, a sample value (denoted by the prefix "S") for light detector A1 is stored by closing switch SW1 and thereby charging capacitor C1 and a sample value for light detector A2 is stored twice by closing switches SW2 and SW4 and thereby charging capacitors C2 and C4. Thus, the sample value for light detector A2 is stored twice: first in relation to Bin 1, and second in relation to Bin 2, as described further below. At or before time 512, sample conversion is performed, which involves opening switches SW1 and SW2 and closing switch SW5 and thereby discharging capacitors C1 and C2 to provide outputs corresponding to sample values of light detectors A1 and A2 respectively. The outputs are converted, by the ADC while selected by switch SW5, to a digital value used for determining sampled values associated with light detectors A1 and A2. However, capacitors C3 and C4 are not selected for discharging and thus still store a charge corresponding to a reset value for light detector A2 and a sample value for the light detector A2 respectively. These values are later used with respect to Bin 2, as described further below. Removing the reset values from the sampled values results in a denoised value that more accurately represents the collective intensity of light received by Bin 1.

In relation to Bin 2, at or before time 514, capacitors C1 and C2 have zero or minimal charge, capacitors C3 and C4 are charged to respectively store a reset value for light detector A2 and a sample value for light detector A2, and the ADC does not sample any output from the common node. At or before time 516, a reset value for light detector A3 is stored twice by closing switches SW1 and SW2 and thereby charging capacitors C1 and C2. Thus, the reset value for light detector A3 is stored twice: first in relation to Bin 2, and second in relation to Bin 3, as described further below. In this manner, a reset value can be used to establish the readout noise associated with light detectors A2 and A3. At or before time 518, reset conversion is performed, which involves opening switches SW2 and SW3 and closing switch SW5 and thereby discharging capacitors C2 and C3 to provide outputs corresponding to reset values of light detectors A3 and A2 respectively. The outputs are converted, by the ADC while selected by switch SW5, to a digital value used for determining the readout noise associated with light detectors A2 and A3. At or before time 520, capacitors C2, and C3 have zero or minimal charge and the ADC does not sample any output from the common node. However, capacitors C1 and C4 are not selected for discharging and thus still respectively store charges corresponding to a reset value for light detector A3 and a sample value for light detector A2.

At or before time 522, a sample value for light detector A3 is stored by closing switches SW2 and SW3 and thereby charging capacitors C2 and C3. Thus, the sample value for light detector A3 is stored twice: first in relation to Bin 2, and second in relation to Bin 3, as described further below. At or before time 524, sample conversion is performed, which involves opening switches SW3 and SW4 and closing switch SW5 and thereby discharging capacitors C3 and C4 to provide outputs corresponding to sample values of light detectors A3 and A2 respectively. The outputs are converted, by the ADC while selected by switch SW5, to a digital value used for determining sampled values associated with light detectors A2 and A3. However, capacitors C1 and C2 are not selected for discharging and thus still store a charge corresponding to a reset value for light detector A3 and a sample value for the light detector A2 respectively. These values are later used with respect to Bin 3, as described further below. Removing the reset values from the sampled values results in a denoised value that more accurately represents the collective intensity of light received by Bin 2.

In relation to Bin 3, at or before time 526, capacitors C3 and C4 have zero or minimal charge, capacitors C1 and C2 are charged to respectively store a reset value for light detector A3 and a sample value for light detector A3, and the ADC does not sample any output from the common node. At or before time 528, a reset value for light detector A3 is stored twice by closing switches SW3 and SW4 and thereby charging capacitors C3 and C4. Thus, the reset value for light detector A4 is stored twice: first in relation to Bin 3, and second in relation to Bin 4. In this manner, a reset value can be used to establish the readout noise associated with light detectors A3 and A4. At or before time 530, reset conversion is performed, which involves opening switches SW1 and SW4 and closing switch SW5 and thereby discharging capacitors C1 and C4 to provide outputs corresponding to reset values of light detectors A3 and A4 respectively. The outputs are converted, by the ADC, to a digital value used for determining the readout noise associated with light detectors A3 and A4. At or before time 532, capacitors C1, and C4 have zero or minimal charge and the ADC does not sample any output from the common node. However, capacitors C2 and C3 are not selected for discharging and thus still respectively store charges corresponding to a sample value for light detector A3 and a reset value for light detector A4.

At or before time 534, a sample value for light detector A4 is stored by closing switches SW2 and SW4 and thereby charging capacitors C2 and C4. Thus, the sample value for light detector A4 is stored twice: first in relation to Bin 3, and second in relation to Bin 4. At or before time 538, sample conversion is performed, which involves opening switches SW1 and SW2 and closing switch SW5 and thereby discharging capacitors C1 and C2 to provide outputs corresponding to sample values of light detectors A4 and A3 respectively. The outputs are converted, by the ADC, to a digital value used for determining sampled values associated with light detectors A3 and A4. However, capacitors C3 and C4 are not selected for discharging and thus still store a charge corresponding to a reset value for light detector A4 and a sample value for the light detector A4 respectively. These values are later used with respect to Bin 4. Removing the reset values from the sampled values results in a denoised value that more accurately represents the collective intensity of light received by Bin 4.

Bin 4, as well as additional bins may be cycled through in a similar manner as that depicted in relation to Bin 1, Bin 2, and Bin 3. This may be performed in accordance with a sampling frequency, which may correspond to the number of light detectors in the bins. For example, a normal image (i.e., an image without bins) may be sampled at about 7.5 us per row of light detectors and a 2×1 bin size may be sampled at about 8.0 us per row of light detectors. In terms of frequency, this corresponds to 133333 rows per second and 125000 rows per second respectively. Increasing the size of bins may correspondingly reduce the sampling rate (i.e., increase the time taken to sample a row of light detectors). Further, increasing the size of the bins may correspondingly increase the number of capacitors used to store reset values and sample values. For instance, the number of capacitors may be twice the number of light detectors in each bin.

III. Example Methods

FIG. 6 is a block diagram of a method, according to an example embodiment. In particular, FIG. 6 shows a method 600 for use in conjunction with determining an image using an array of light sensors. Method 600 may be implemented in accordance with system 100, array 112, system 400, system 500 or the description thereof. For example, aspects of the functions of method 600 may be performed by controller 104.

At block 602, method 600 includes using a plurality of switches corresponding to a plurality of capacitors to select a first set of capacitors from the plurality of capacitors for charging at a first time. For example, the plurality of switches may correspond to selecting capacitors C1, C2, and C4 for charging at time 510, as described above with respect to FIG. 5. In this example, charging the first set of capacitors corresponds to sampling from a first set of adjacent light detectors. For example, this may involve sampling from binned light detectors of the array of light detectors using the light detector sampling circuit 114 described above with respect to FIGS. 4A and 4B. The first set of adjacent light detectors is associated with an array of light detectors comprising a plurality of sets of adjacent light detectors. For example, the first set may correspond to Bin 1 shown in FIG. 5. The first set of light detectors, in this context, may relate to a 2×1 bin, 1×2 bin, 2×2 bin, or another configuration of adjacent light detectors.

At block 604, method 600 includes using the plurality of switches to select a second set of capacitors from the plurality of capacitors for discharging at a second time, wherein the second set of capacitors is different from the first set of capacitors. In this example, selecting the second set of capacitors for discharging may correspond to discharging capacitors C1 and C2 at time 512, as described above with respect to FIG. 5.

At block 606, method 600 includes using a sampling switch to sample an output of the second set of capacitors as they discharge. For example, using the sampling switch to sample the output may correspond to using the sampling switch to convert the outputs of discharging capacitors C1 and C2 at time 512, as described above with respect to FIG. 5. In this example, the output of the second set of capacitors corresponds to the first set of adjacent light detectors. For instance, as shown in FIG. 5, though capacitors C1, C2, and C4 are used for storing sample values of Bin 1, only capacitors C1 and C2 are used for purposes providing an output for Bin 1.

At block 608, method 600 further includes determining, based on sampling the output of the second set of capacitors, a collective intensity of light received by the first set of adjacent light detectors. For example, this may correspond to using an ADC at time 512 to determine the collective intensity of light received by light detectors A1 and A2 by sampling a voltage and/or current output from capacitors C1 and C2.

Within examples, method 600 further includes, at a third time prior to the first time, using the plurality of switches to select a third set of capacitors for charging. For example, this may correspond to may correspond to discharging charging capacitors C1, C3, and C4 at time 504, as described above with respect to FIG. 5. Charging the third set of capacitors in this manner corresponds to sampling a reset value from the first set of adjacent light detectors (e.g., light detectors A1 and A2). Within these examples, method 600 further includes using the plurality of switches to select a fourth set of capacitors from the plurality of capacitors for discharging at a fourth time. For example, this may correspond to discharging capacitors C1 and C4 at time 506 as described above with respect to FIG. 5. In these examples, the fourth set of capacitors is different from the third set of capacitors. For example, in the example shown in FIG. 5, capacitor C3 is selected for discharging.

Within examples involving the third set of capacitors and the fourth set of capacitors, method 600 further includes using the sampling switch to sample an output of the fourth set of capacitors as they discharge. This may correspond to using the ADC to sample an output voltage and/or current of capacitors C1 and C4 as they discharge at time 506, as described above with respect to FIG. 5. The output of the fourth set of capacitors corresponds to the reset value from the first set of adjacent light detectors (e.g., light detectors A1 and A2). Within these examples, determining the collective intensity of light received by the first set of adjacent light detectors includes determining the collective intensity of light received by the first set of adjacent light detectors based on the reset value from the first set of adjacent light detectors. In this manner, a readout noise corresponding to the first set of adjacent light detectors can be accounted for (e.g., removed) when determining the collective intensity of light. Determining the collective intensity of light may correspond to an average value of a denoised value determined from discharging the second set of capacitors.

Within related examples, method 600 further includes cycling through the plurality of sets of adjacent light detectors using the plurality of switches corresponding to the plurality of capacitors to determine collective intensities of light received by each set of adjacent light detectors. In this manner, image may be determined based on determining collective intensities of light received by each set of adjacent light detectors. As described above with respect to FIG. 5, this may be performed sequentially by the system 500, or may include sampling from multiple portions (e.g., rows) of the array in parallel to expedite sampling from each set of adjacent light detectors.

Within examples, method 600 further includes determining an operational parameter value of an image capture device associated with the array of light detectors. For example, the operational parameter may be a light level of an environment of the image capture device. In these examples, the image capture device is configured to operate in at least a first operation mode and a second operation mode. The method 600 further includes changing from the first operation mode to the second operation mode based on the operational parameter value of the image capture device. For example, the image capture device may operate in a default mode for capturing images and may change operation modes to capture images in accordance with blocks 602-608 in response to determining the operational status.

Within related examples, determining the operational status of the image capture device may include capturing an image using the array of light detectors, determining a light level in the image, and determining that the light level is less than a threshold light level (e.g., 50 Lux). These low-light conditions may be associated with the second operation node. Thus, the first operation mode includes using the sampling switch to determine an intensity of light associated with each individual light detector directly from an output of a light detector sampling circuit. In alternative examples, one or more capacitors may also be used for storing a reset value for each light detector, and thus an image may be determined by sampling from outputs from discharging the one or more capacitors. Returning to the present example, using the plurality of switches corresponding to the plurality of capacitors to select the first set of capacitors includes using the plurality of switches corresponding to the plurality of capacitors to select the first set of capacitors responsive to changing from the first operation mode to the second operation mode.

Within related examples the first operation mode includes cycling through the plurality of sets of adjacent light detectors at a first sampling rate associated with the first operation mode For example, sampling each row of light detectors in the array may, by default, take the image capture device about 7.5 μs. In these examples, changing from the first operation mode to the second operation mode includes changing from the first sampling rate to a second sampling rate associated with the second operation mode (e.g., about 8.0 μs). The second sampling rate is less than the first sampling rate. For example, this may be to account for additional charging and discharging steps associated with binning adjacent light detectors in the second operation mode.

Within examples, the first set of adjacent light detectors (e.g., Bin 1 described in relation to FIG. 5) includes a first light detector (e.g., light detector A1) and a second light detector (e.g., light detector A2), the plurality of sets of adjacent light detectors further includes a second set of adjacent light detectors (e.g., Bin 2), and the second set of adjacent light detectors includes the second light detector and a third light detector (e.g., A3). Within these examples, using the plurality of switches corresponding to the plurality of capacitors to select the first set of capacitors includes selecting a first capacitor (e.g., C1 at time 510) for charging corresponding to sampling the first light detector, selecting a second capacitor (e.g., C2 at time 510) for charging corresponding to sampling the second light detector, and selecting a third capacitor (e.g., C4) for charging corresponding to sampling the second light detector. In this manner, for a given set of adjacent light detectors, at least one of the light detectors is sampled two or more times. In examples where there are several binned light detectors in a given set of light detectors, a given light detector can be sampled several times to ensure that each bin that contains that light detector can use the same value. Within these examples, using the plurality of switches to select the second set of capacitors includes using the plurality of switches to select the first capacitor and the second capacitor, and not to select the third capacitor.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   an array of light detectors, wherein the array of light detectors comprises a plurality of sets of adjacent light detectors, and wherein each set of adjacent light detectors comprises at least two adjacent light detectors;
   a light detector sampling circuit connected to the array of light detectors;
   a plurality of capacitors connected in parallel to an output of the light detector sampling circuit via a common node;
   a plurality of switches connected to the plurality of capacitors and configured to select the plurality of capacitors for charging and discharging;
   a sampling switch connected to the plurality of switches at the common node; and
   a controller, wherein the controller is configured to perform a set of functions comprising:
   using the plurality of switches to select a first set of capacitors from the plurality of capacitors for charging at a first time;
   using the plurality of switches to select a second set of capacitors from the plurality of capacitors for discharging at a second time, wherein the second set of capacitors is different from the first set of capacitors; and
   using the sampling switch to sample an output of the second set of capacitors as they discharge, wherein the output of the second set of capacitors corresponds to a first set of adjacent light detectors; and
   determining, based on sampling the output of the second set of capacitors, a collective intensity of light received by the first set of adjacent light detectors.

2. The system of claim 1, wherein each set of adjacent light detectors comprises a number of light detectors to be binned together, and wherein the plurality of capacitors comprises a number of capacitors that is twice the number of light detectors to be binned together.

3. The system of claim 1, wherein the array of light detectors comprises a row of light detectors, and wherein the plurality of sets of adjacent light detectors comprises sets of two adjacent light detectors that overlap sequentially along the row of light detectors such that two sequential sets of adjacent light detectors share a common light detector.

4. The system of claim 1, wherein the array of light detectors comprises two rows of light detectors, and wherein the plurality of sets of light detectors comprises sets of four adjacent light detectors that overlap sequentially along the two rows of light detectors such that two sequential sets of adjacent light detectors share two common light detectors.

5. The system of claim 1, further comprising an Analog-to-Digital Converter (ADC), connected to the sampling switch, wherein determining the collective intensity of light received by the first set of adjacent light detectors comprises sampling, by the ADC, a voltage and/or current associated with discharging the second set of capacitors.

6. The system of claim 1, wherein the controller is configured to operate in at least a first operation mode and a second operation mode,
   wherein the first operation mode comprises using the sampling switch to determine an intensity of light associated with each individual light detector directly from an output of the light detector sampling circuit,
   wherein the set of functions corresponds to the second operation mode, the system further comprising a sensor, and
   wherein, based on an output of the sensor, the controller switches from the first operating mode to the second operating mode.

7. The system of claim 6, wherein the sensor is a light sensor configured to detect a light level of an environment of the system, and wherein switching from the first operating mode to the second operating mode is performed responsive to an output of the light sensor indicating that the light level is less than a threshold light level.

8. The system of claim 6, wherein the first operating mode corresponds to a first sampling rate and the second operating mode corresponds to a second sampling rate that is less than the first sampling rate.

9. A method comprising:
   using a plurality of switches corresponding to a plurality of capacitors to select a first set of capacitors from the plurality of capacitors for charging at a first time, wherein charging the first set of capacitors corresponds to sampling from a first set of adjacent light detectors, wherein the first set of adjacent light detectors is associated with an array of light detectors comprising a plurality of sets of adjacent light detectors;
   using the plurality of switches to select a second set of capacitors from the plurality of capacitors for discharging at a second time, wherein the second set of capacitors is different from the first set of capacitors;
   using a sampling switch to sample an output of the second set of capacitors as they discharge, wherein the output of the second set of capacitors corresponds to the first set of adjacent light detectors; and
   determining, based on sampling the output of the second set of capacitors, a collective intensity of light received by the first set of adjacent light detectors.

10. The method of claim 9, further comprising:
    at a third time prior to the first time, using the plurality of switches to select a third set of capacitors for charging, wherein charging the third set of capacitors corresponds to sampling a reset value from the first set of adjacent light detectors;
    using the plurality of switches to select a fourth set of capacitors from the plurality of capacitors for discharging at a fourth time, wherein the fourth set of capacitors is different from the third set of capacitors; and using the sampling switch to sample an output of the fourth set of capacitors as they discharge, wherein the output of the fourth set of capacitors corresponds to the reset value from the first set of adjacent light detectors, and wherein determining the collective intensity of light received by the first set of adjacent light detectors comprises determining the collective intensity of light received by the first set of adjacent light detectors based on the reset value from the first set of adjacent light detectors.

11. The method of claim 9, further comprising cycling through the plurality of sets of adjacent light detectors using the plurality of switches corresponding to the plurality of capacitors to determine collective intensities of light received by each set of adjacent light detectors.

12. The method of claim 11, further comprising determining an image based on determining collective intensities of light received by each set of adjacent light detectors.

13. The method of claim 9, further comprising:
determining an operational parameter value of an image capture device associated with the array of light detectors, wherein the image capture device is configured to operate in at least a first operation mode and a second operation mode; and
changing from the first operation mode to the second operation mode based on the operational parameter value of the image capture device.

14. The method of claim 13, wherein determining the operational parameter value of the image capture device comprises:
capturing an image using the array of light detectors;
determining a light level in the image;
determining that the light level is less than a threshold light level.

15. The method of claim 13, wherein the first operation mode comprises using the sampling switch to determine an intensity of light associated with each individual light detector directly from an output of a light detector sampling circuit, and
wherein using the plurality of switches corresponding to the plurality of capacitors to select the first set of capacitors comprises using the plurality of switches corresponding to the plurality of capacitors to select the first set of capacitors responsive to changing from the first operation mode to the second operation mode.

16. The method of claim 13, wherein the first operation mode comprises cycling through the plurality of sets of adjacent light detectors at a first sampling rate associated with the first operation mode, and
wherein changing from the first operation mode to the second operation mode comprises changing from the first sampling rate to a second sampling rate associated with the second operation mode, wherein the second sampling rate is less than the first sampling rate.

17. The method of claim 9, wherein the first set of adjacent light detectors comprises a first light detector and a second light detector, wherein the plurality of sets of adjacent light detectors further comprises a second set of adjacent light detectors, wherein the second set of adjacent light detectors comprises the second light detector and a third light detector,
wherein using the plurality of switches corresponding to the plurality of capacitors to select the first set of capacitors, comprises:

(i) selecting a first capacitor for charging corresponding to sampling the first light detector;
(ii) selecting a second capacitor for charging corresponding to sampling the second light detector; and
(iii) selecting a third capacitor for charging corresponding to sampling the second light detector, and
wherein using the plurality of switches to select the second set of capacitors comprises using the plurality of switches to select the first capacitor and the second capacitor, and not to select the third capacitor.

18. A non-transitory computer readable medium having instructions stored thereon that when executed by a processor cause performance of a set of functions, wherein the set of functions comprises:
using a plurality of switches corresponding to a plurality of capacitors to select a first set of capacitors from the plurality of capacitors for charging at a first time, wherein charging the first set of capacitors corresponds to sampling from a first set of adjacent light detectors, wherein the first set of adjacent light detectors is associated with an array of light detectors comprising a plurality of sets of adjacent light detectors;
using the plurality of switches to select a second set of capacitors from the plurality of capacitors for discharging at a second time, wherein the second set of capacitors is different from the first set of capacitors; and
using a sampling switch to sample an output of the second set of capacitors as they discharge, wherein the output of the second set of capacitors corresponds to the first set of adjacent light detectors; and
determining, based on sampling the output of the second set of capacitors, a collective intensity of light received by the first set of adjacent light detectors.

19. The non-transitory computer readable medium of claim 18, wherein the set of functions further comprise:
at a third time prior to the first time, using the plurality of switches to select a third set of capacitors for charging, wherein charging the third set of capacitors corresponds to sampling a reset value from a first set of adjacent light detectors;
using the plurality of switches to select a fourth set of capacitors from the plurality of capacitors for discharging at a fourth time, wherein the fourth set of capacitors is different from the third set of capacitors; and
using the sampling switch to sample an output of the fourth set of capacitors as they discharge, wherein the output of the fourth set of capacitors corresponds to the reset value from the first set of adjacent light detectors, and wherein determining the collective intensity of light received by the first set of adjacent light detectors comprises determining the collective intensity of light received by the first set of adjacent light detectors based on the reset value from the first set of adjacent light detectors.

20. The non-transitory computer readable medium of claim 19, wherein the set of functions further comprise:
cycling through the plurality of sets of adjacent light detectors using the plurality of switches corresponding to the plurality of capacitors to determine collective intensities of light received by each set of adjacent light detectors.

* * * * *